United States Patent
Hulick, Jr. et al.

(10) Patent No.: US 11,012,523 B2
(45) Date of Patent: May 18, 2021

(54) DYNAMIC CIRCUIT BREAKER APPLICATIONS USING A PROXYING AGENT

(71) Applicant: Cisco Technology, Inc., San Jose, CA (US)

(72) Inventors: Walter Theodore Hulick, Jr., Pearland, TX (US); Harish Nataraj, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/520,919

(22) Filed: Jul. 24, 2019

(65) Prior Publication Data

US 2021/0029210 A1    Jan. 28, 2021

(51) Int. Cl.
*H04L 29/08* (2006.01)
*H04L 12/24* (2006.01)
*H04L 12/26* (2006.01)

(52) U.S. Cl.
CPC ...... *H04L 67/2804* (2013.01); *H04L 41/0681* (2013.01); *H04L 41/5025* (2013.01); *H04L 43/14* (2013.01)

(58) Field of Classification Search
CPC ............... H04L 29/06; H04L 29/0809; H04L 29/06047; H04L 29/08072; H04L 41/0681; H04L 41/5025; H04L 43/14; H04L 67/00; H04L 67/2804; G06F 13/00; G06Q 30/02
USPC ........................................................ 709/203
See application file for complete search history.

(56) References Cited

U.S. PATENT DOCUMENTS

| | | | |
|---|---|---|---|
| 10,089,309 B2 * | 10/2018 | Polacek | H04L 67/1029 |
| 2012/0144187 A1 * | 6/2012 | Wei | H04L 63/0281 713/152 |
| 2017/0230295 A1 * | 8/2017 | Polacek | H04L 65/80 |

OTHER PUBLICATIONS

Ball, Lance, "Protect Your Node.js REST Clients with Circuit Breakers", online: http://lanceball.com/words/2017/01/05/protect-your-node-js-rest-clients-with-circuit-breakers/, Jan. 2017, 5 pages.
Fowler, Martin, "CircuitBreaker", online: https://www.martinfowler.com/bliki/CircuitBreaker.html, Mar. 2014, 6 pages.
(Continued)

*Primary Examiner* — Robert B Harrell
(74) *Attorney, Agent, or Firm* — Behmke Innovation Group LLC; James M. Behmke; Jonathon P. Western

(57) ABSTRACT

In one embodiment, a proxying agent loaded at application startup loads a circuit breaker framework into a class loader, and also loads a circuit breaker proxy into an extension class loader seen by the proxying agent and by the application. The proxying agent may also instrument selected methods of the application, such that, when calling to run an instrumented method: an ID of the circuit breaker proxy is set to a trackable context, and the proxy execution may be held until exit of the run method (and if exit of the run method is due to a particular exception, an exception of the proxy may also be set to reflect the particular exception). The circuit breaker may then monitor the proxy for latency, exceptions, and circuit breaker trip criteria, and stops the run method in response to the latency, exceptions, or circuit breaker trip criteria surpassing a particular respective threshold.

20 Claims, 18 Drawing Sheets

(56) References Cited

OTHER PUBLICATIONS

"Circuit-Breaker-js", online: https://www.npmjs.com/package/circuit-breaker-js, Jul. 2014, 6 pages.
"Circuit Breakers for Node.js Microservices", online: http://www.craigfreeman.net/blog/2018/10/circuit-breakers-for-node-js-microservices/, Oct. 2018, 4 pages.
"Hystrix Network Auditor Agent", online: https://github.com/Netflix/Hystrix/tree/master/hystrix-contrib/hystrix-network-auditor-agent, GitHub, Sep. 27, 2016, 2 pages.
"PEP 532—A Circuit Breaking Protocol and Binary Operators", online: https://www.python.org/dev/peps/pep-0532/, Oct. 2016, 23 pages.

* cited by examiner

```
Wed Feb 21 09:26:57 CST 2018: >>>> Id: -1, Have Hystrix Event from Command servlet.HystrixProxyDemo
Servlet$ConfigClass:966544353:executeConfigFile:(IILjava/lang/String;)V, event type is SUCCESS
Wed Feb 21 09:26:57 CST 2018:
>>>>>>>> Class servlet.HystrixProxyDemoServlet$ConfigClass
Id 1
Method executeConfigFile
Command key servlet.HystrixProxyDemoServlet$ConfigClass:966544353:executeConfigFile:(IILjava/lang/String;)V
Command group key servlet.HystrixProxyDemoServlet$ConfigClass:executeConfigFile:(IILjava/lang/String;)V
Circuit breaker open false
Execution short circuited false
Circuit breaker overridden false
Execution Complete True
Execution Failed false
Execution Exception null
Execution Timeout false
Execution Time: 799
Real Execution Time: 809
Metric Execution Mean 0
```

FIG. 8

```
Wed Feb 21 09:34:21 CST 2018: >>>> Id: -1, Have Hystrix Event from Command Servlet.HystrixProxyDemo
Servlet$ConfigClass:96654435:executeConfigFile:(IILjava/lang/String;)V, event type is TIMEOUT
Wed Feb 21 09:34:21 CST 2018:
>>>> id: 2, Failure Has occurred due to Latency of 1007, fallback being called
Wed Feb 21 09:34:21 CST 2018: >>>> Id: -1, Have Hystrix Event from Command servlet.HystrixProxyDemo
Servlet$ConfigClass:96654435: executeConfigFile:(IILjava/lang/String;)V, event type is FALLBACK_SUCCESS
Wed Feb 21 09:34:21 CST 2018:
>>>>>>> Class servlet.HystrixProxyDemoServlet$ConfigClass
Id 2
Method executeConfigFile
Command key servlet.HystrixProxyDemoServlet$ConfigClass:96654435:executeConfigFile:(IILjava/lang/String;)V
Command group key servlet.HystrixProxyDemoServlet$ConfigClass:executeConfigFile:(IILjava/lang/String;)V
Circuit breaker open false
Execution short circuited false
Circuit breaker overridden false
Execution Complete true
Execution Failed false
Execution Exception null
Execution Timeout true
Execution Time: 1010
Real Execution Time: 1011
Metric Execution Mean 0
```

FIG. 9

```
Wed Feb 21 09:42:09 CST 2018: >>>> Id: -1, Have Hystrix Event from Command https://bad.bad.bad, event type is
FAILURE
Wed Feb 21 09:42:09 CST 2018:
>>>> id: 4, Failure has occurred due to Exception java.net.UnknownHostException: bad.bad.bad, fallback being
called
Wed Feb 21 09:42:09 CST 2018: >>>> Id: -1, Have Hystrix Event from Command https://bad.bad.bad, event type is
FALLBACK_SUCCESS
Wed Feb 21 09:42:09 CST 2018:
>>>>>>> Class sun.net.www.protocol.https.HttpsClient
Id 4
Method New
Command key https://bad.bad.bad
Command group key sun.net.www.protocol.https.HttpsClient:New:(Ljavax/net/ssl/SSLSocketFactory;Ljava/net/URL;
Ljavax/net/ssl/HostnameVerifier;Ljava/net/Proxy;ZILsun/net/www/protocol/http/HttpURLConnection;)Lsun/net/
www/http/HttpClient;
Circuit breaker open false
Execution short circuited false
Circuit breaker overridden false
Execution Complete true
Execution Failed true
Execution Exception java.net.UnknownHostException; bad.bad.bad
Execution Timeout false
Execution Time: 5
Real Execution Time: 6
Metric Execution Mean 0
```

FIG. 10

```
Wed Feb 21 09:45:14 CST 2018: >>>> Id: -1, Have Hystrix Event from Command servlet.HystrixProxyDemoServlet
$ConfigClass:966544353: executeConfigFile:(IILjava/lang/String;)V, event type is SHORT_CIRCUITED
Wed Feb 21 09:45:14 CST 2018:
>>>> id: 8, Failure has occurred due to CircuitBreaker action, fallback being called
Wed Feb 21 09:45:14 CST 2018: >>>> Id: -1, Have Hystrix Event from Command servlet.HystrixProxyDemoServlet
$ConfigClass:966544353: executeConfigFile:(IILjava/lang/String;)V, event type is FALLBACK_SUCCESS
Wed Feb 21 09:45:14 CST 2018:
>>>>>>> Class servlet.HystrixProxyDemoServlet$ConfigClass
Id 8
Method executeConfigFile
Command key servlet.HystrixProxyDemoServlet$ConfigClass:966544353:executeConfigFile:(IILjava/lang/String;)V
Command group key servlet.HystrixProxyDemoServlet$ConfigClass:executeConfigFile:(IILjava/lang/String;)V
Circuit breaker open true
Execution short circuited true
Circuit breaker overridden false
Execution Complete true
Execution Failed false
Execution Exception null
Execution Timeout false
Execution Time: -1
Real Execution Time: 1
Metric Execution Mean 754
```

FIG. 11

Circuit 1210  Sort: Error then Volume | Alphabetical | Volume | Error | Mean | Median | 90 | 99 | 99.5

| https://www.cisco.com | serv...Ljava/lang/String;)V | https://bad.bad.bad |
|---|---|---|
| ○ 0|0 0.0%<br>   0|0<br>   0|0 | ○ 2|0 0.0%<br>   0|0<br>   0|0 | ○ 0|0 0.0%<br>   0|0<br>   0|0 |
| —  Host: 0.1/s<br>   Cluster: 0.1/s<br>   Circuit Closed | —  Host: 0.1/s<br>   Cluster: 0.1/s<br>   Circuit Closed | —  Host: 0.1/s<br>   Cluster: 0.1/s<br>   Circuit Closed |
| Hosts  1  90th  66ms<br>Median  66ms  99th  66ms<br>Mean  66ms  99.5th  66ms | Hosts  1  90th  504ms<br>Median  504ms  99th  504ms<br>Mean  504ms  99.5th  504ms | Hosts  1  90th  0ms<br>Median  0ms  99th  0ms<br>Mean  0ms  99.5th  0ms |

Thread Pools 1220  Sort: Alphabetical | Volume |

| sun...www/http/HttpClient; | serv...Ljava/lang/String;)V | annotationClass |
|---|---|---|
| ○ Host:0.0/s<br>   Cluster:0.0/s | ○ Host:0.0/s<br>   Cluster:0.0/s | ○ Host:0.0/s<br>   Cluster:0.0/s |
| Active  0  Max Active  0<br>Queued  0  Executions  0<br>Pool Size  5  Queue Size  3 | Active  0  Max Active  0<br>Queued  0  Executions  0<br>Pool Size  5  Queue Size  10 | Active  0  Max Active  0<br>Queued  0  Executions  0<br>Pool Size  5  Queue Size  2 |

DYNAMIC CIRCUIT BREAKER APPLICATIONS USING A PROXYING AGENT

TECHNICAL FIELD

The present disclosure relates generally to computer systems, and, more particularly, to dynamic circuit breaker applications using a proxying agent.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In addition, a fairly new and emerging technology known as "circuit breakers" is popular and gaining momentum, particularly in microservice developments. Application circuit breakers are configured to shut down transaction components based on extended transaction latency and, more specifically, repeated failures from latency and/or exceptions (failures). This prevents downstream cascading failures and allows for a "cooling period" to potentially recover and execute "fallback methods". Hystrix, by Netflix, Inc., is one of the best known and most widely used circuit breaker technologies (e.g., currently found in about 20% of all Java applications).

Current circuit breaker technology, however, is primitive. For instance, it requires "wrapping" (coding) of methods to be controlled by the circuit breaker, and it requires manual integration of the framework and coding using "subclassing" and/or "annotations" which impacts development resources, and release timeframes. It also requires manually trying to find what should be controlled by the circuit breaker, and how it should be controlled. In addition, circuit breakers today will not allow the circuit breaker to be applied to third party libraries because developers do not have the code for those libraries. Perhaps most importantly, though, circuit breaker technology is currently required to be integrated in the application, thus being very persistent (i.e., once you make changes in the code and implement a circuit breaker, it cannot be dynamically removed), which can be a problem, especially when issues and instabilities are discovered in the circuit breaker code itself (such, as, for instance, Hystrix, which was reverted and pinned to an earlier stable version and set to an unsupported maintenance-only mode in November 2018 once issues and instabilities were uncovered in more recent versions). For all of these reasons, there has been a large barrier to adoption of circuit breakers, which could be a very powerful technology if implemented correctly.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 8 illustrates an example circuit breaker log showing a "normal" operation;

FIG. 9 illustrates an example circuit breaker log showing a "timeout" during operation;

FIG. 10 illustrates an example circuit breaker log showing an "exception" during operation;

FIG. 11 illustrates an example circuit breaker log showing a "short circuit" (circuit breaker trip) during operation;

FIG. 12 illustrates an example circuit breaker dashboard;

DESCRIPTION OF EXAMPLE EMBODIMENTS

Overview

Figure 1A:
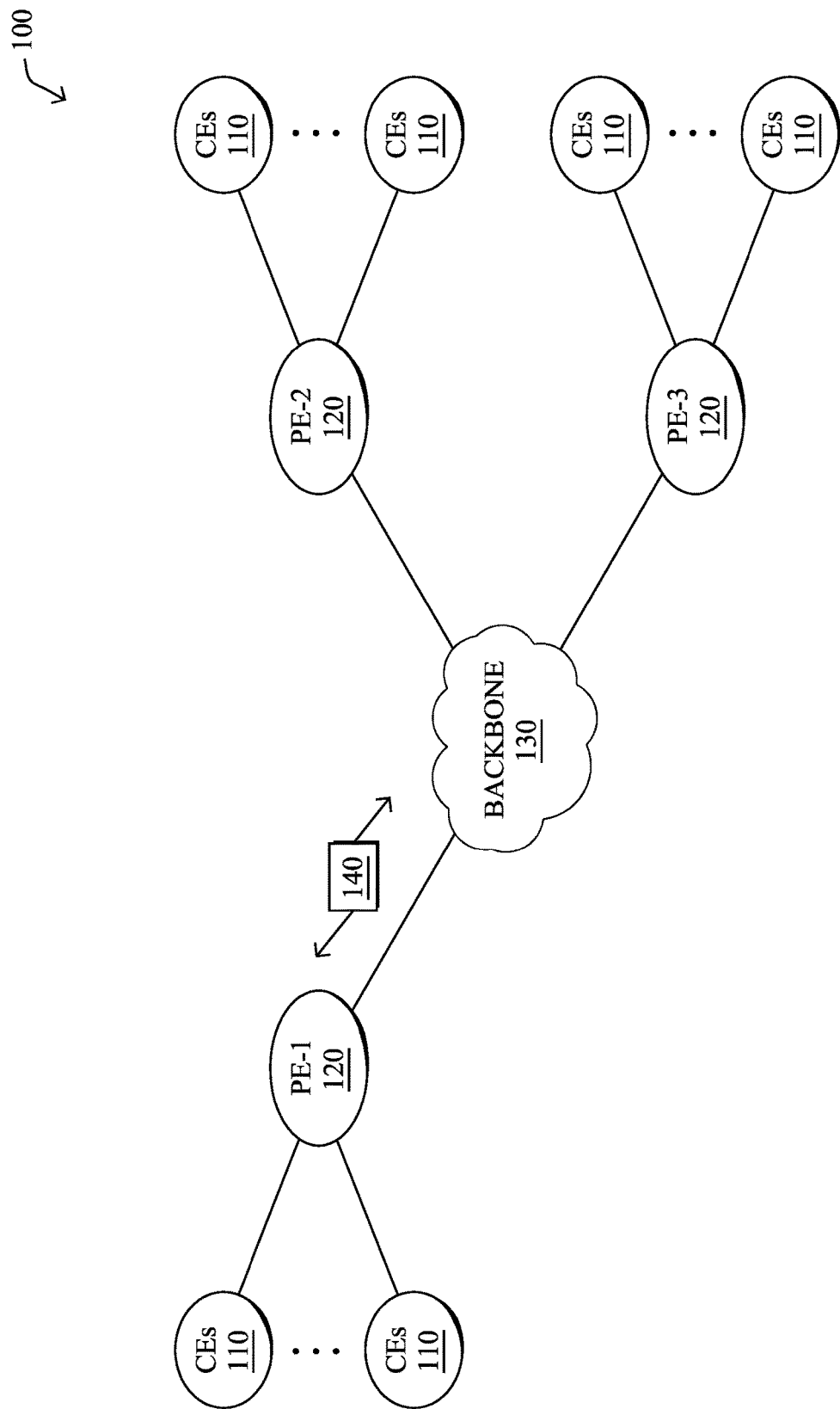
FIGS. 1A-1B illustrate an example computer network.

According to one or more embodiments of the disclosure, a proxying agent loaded at an application startup loads a circuit breaker framework into a class loader, and also loads a circuit breaker proxy into an extension class loader seen by the proxying agent and by the application. The proxying agent may also instrument selected methods of the application, such that the following may occur in response to a call to run an instrumented method. In particular, an identifier (ID) of the circuit breaker proxy may be set to a trackable context, and the proxy execution may be held until exit of the run method. Notably, if exit of the run method is due to a particular exception, an exception of the proxy may also be set to reflect the particular exception. According to the techniques herein, the circuit breaker may then monitor the proxy for latency, exceptions, and circuit breaker trip criteria, and stops the run method in response to the latency, exceptions, or circuit breaker trip criteria surpassing a particular respective threshold.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
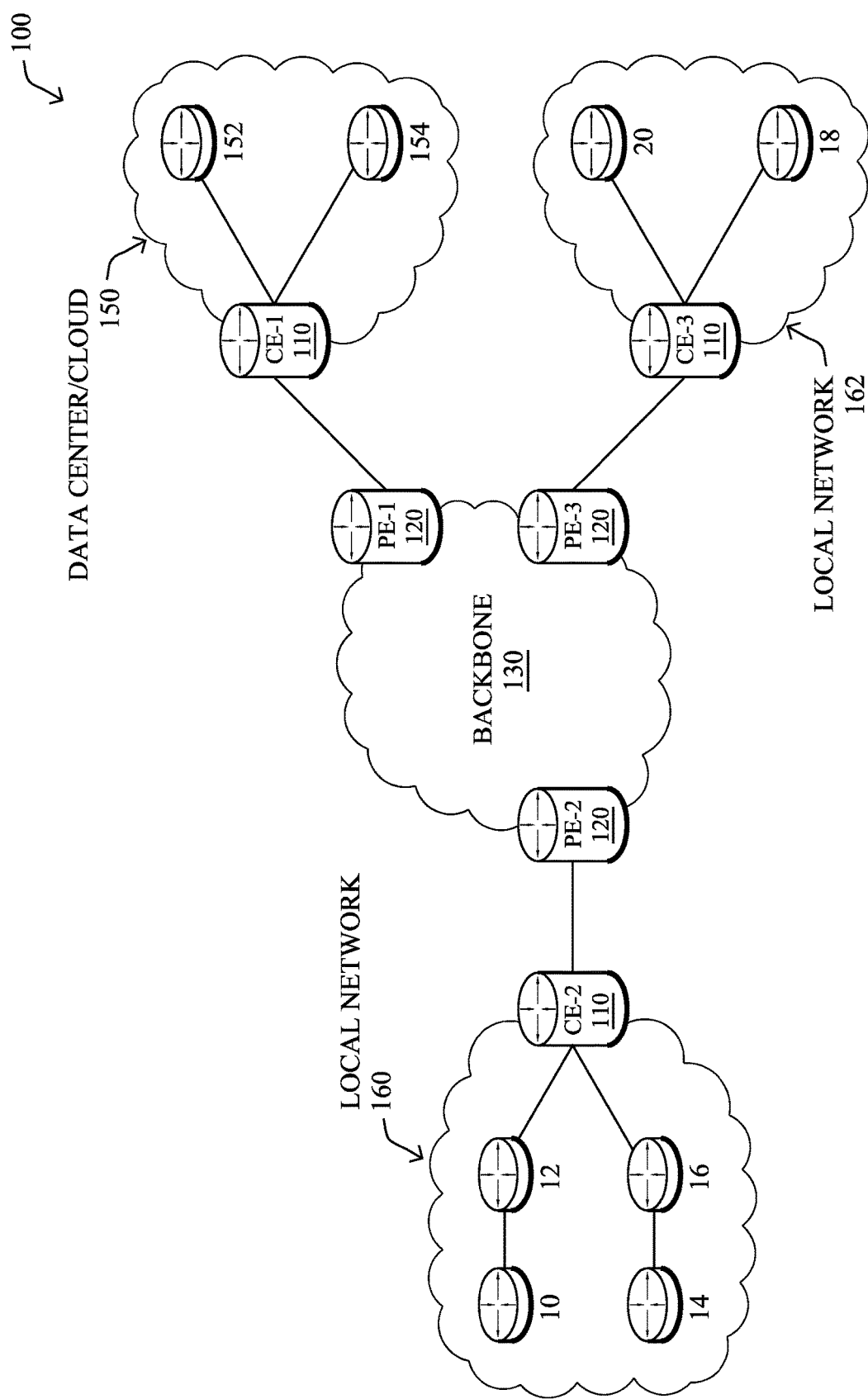

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
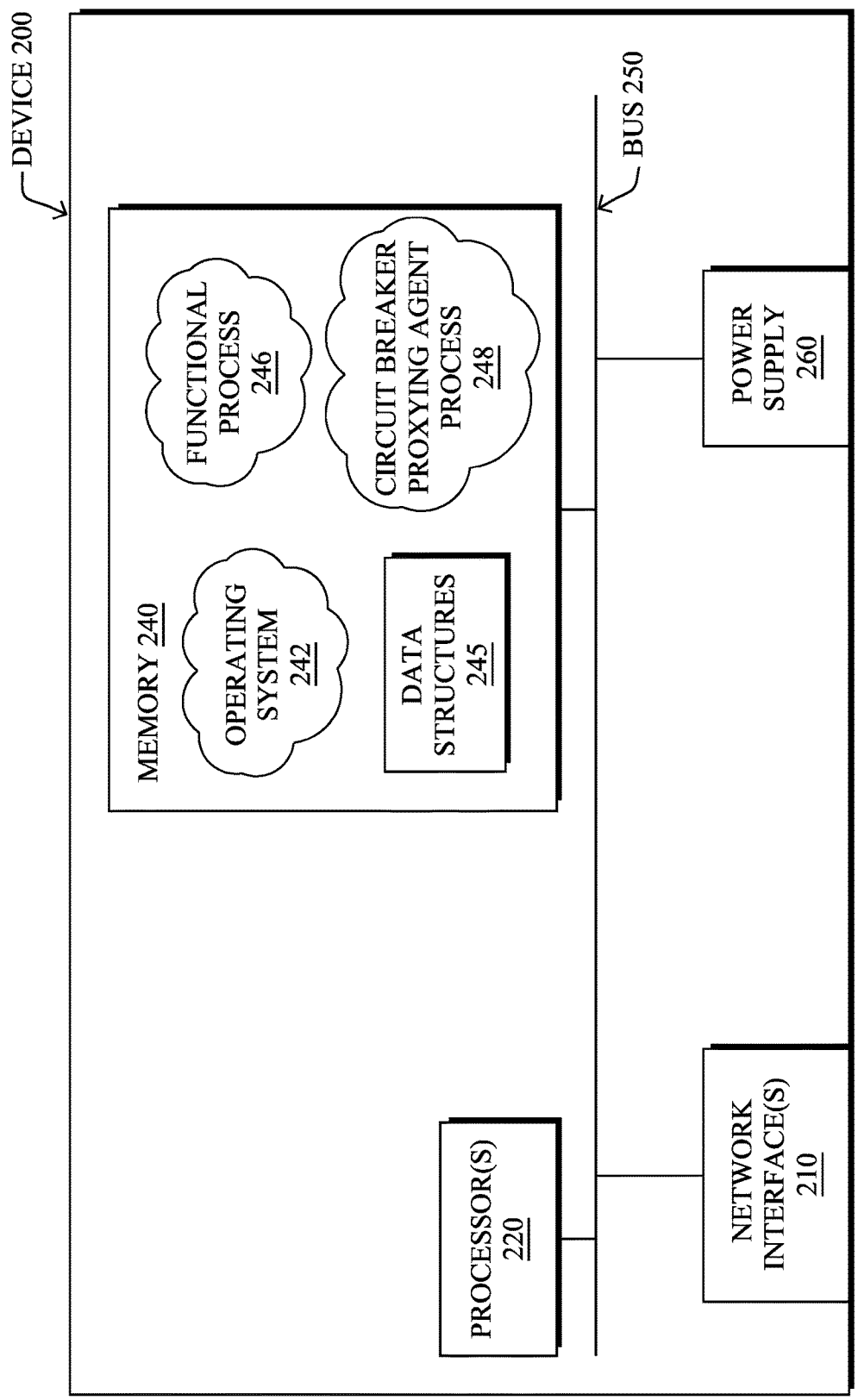
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "circuit breaker proxying agent" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

Certain embodiments herein may relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
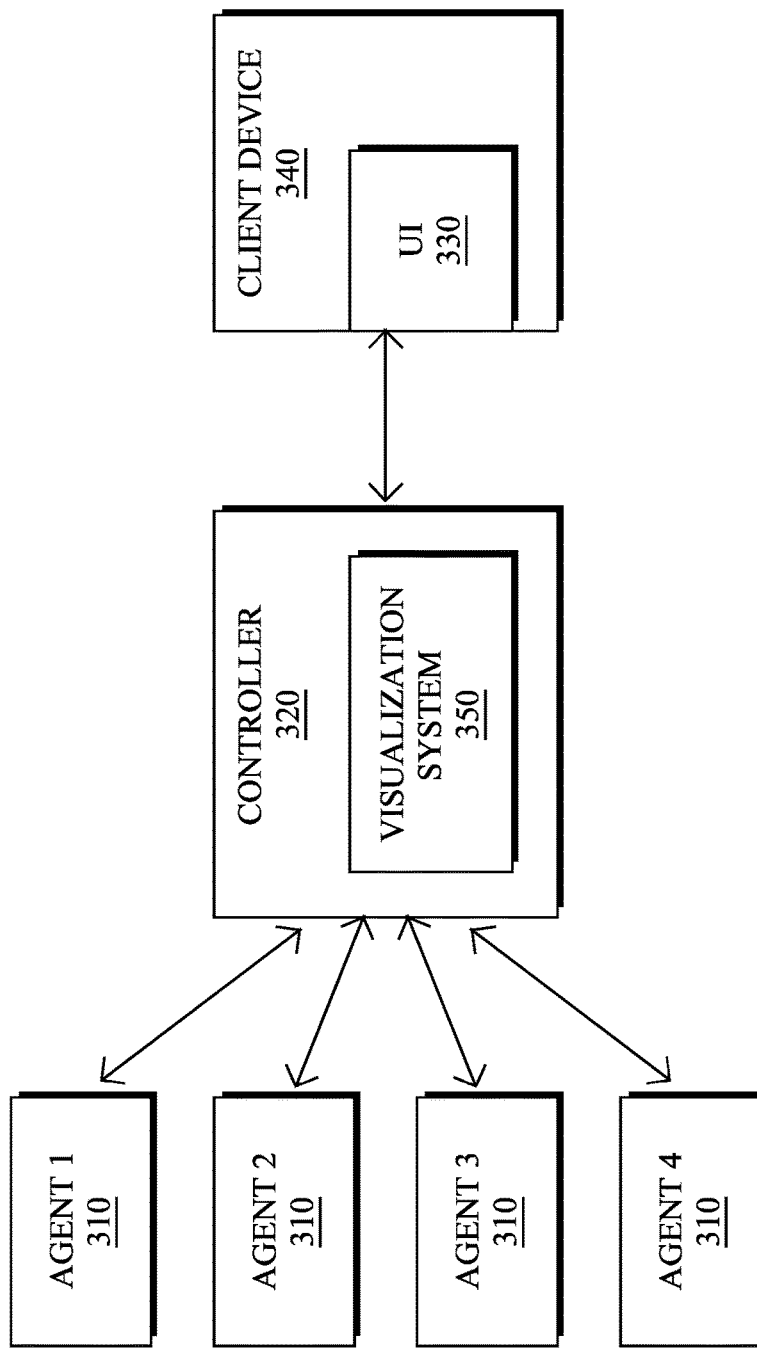
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
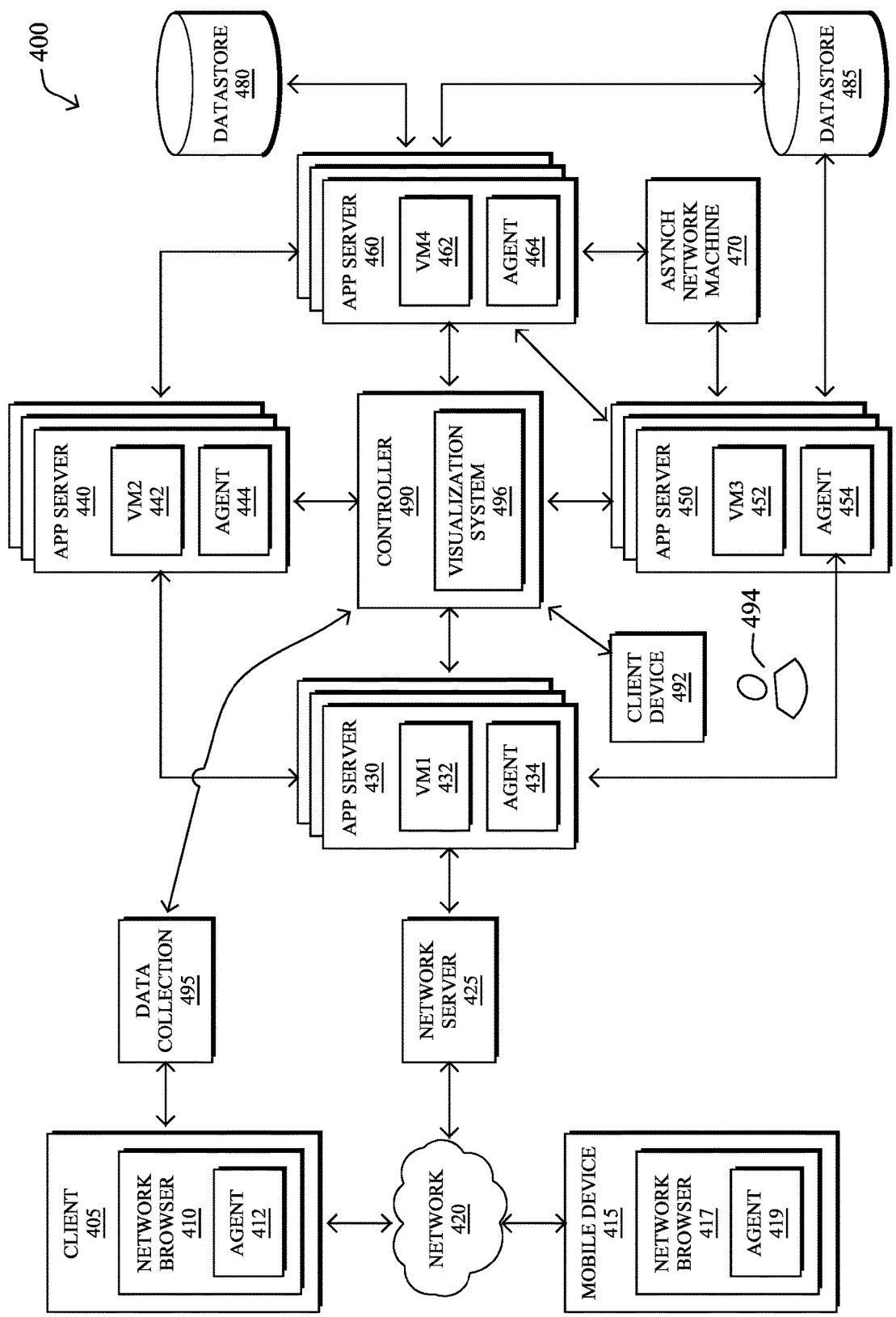
FIG. 4 illustrates an example system for implementing the example application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
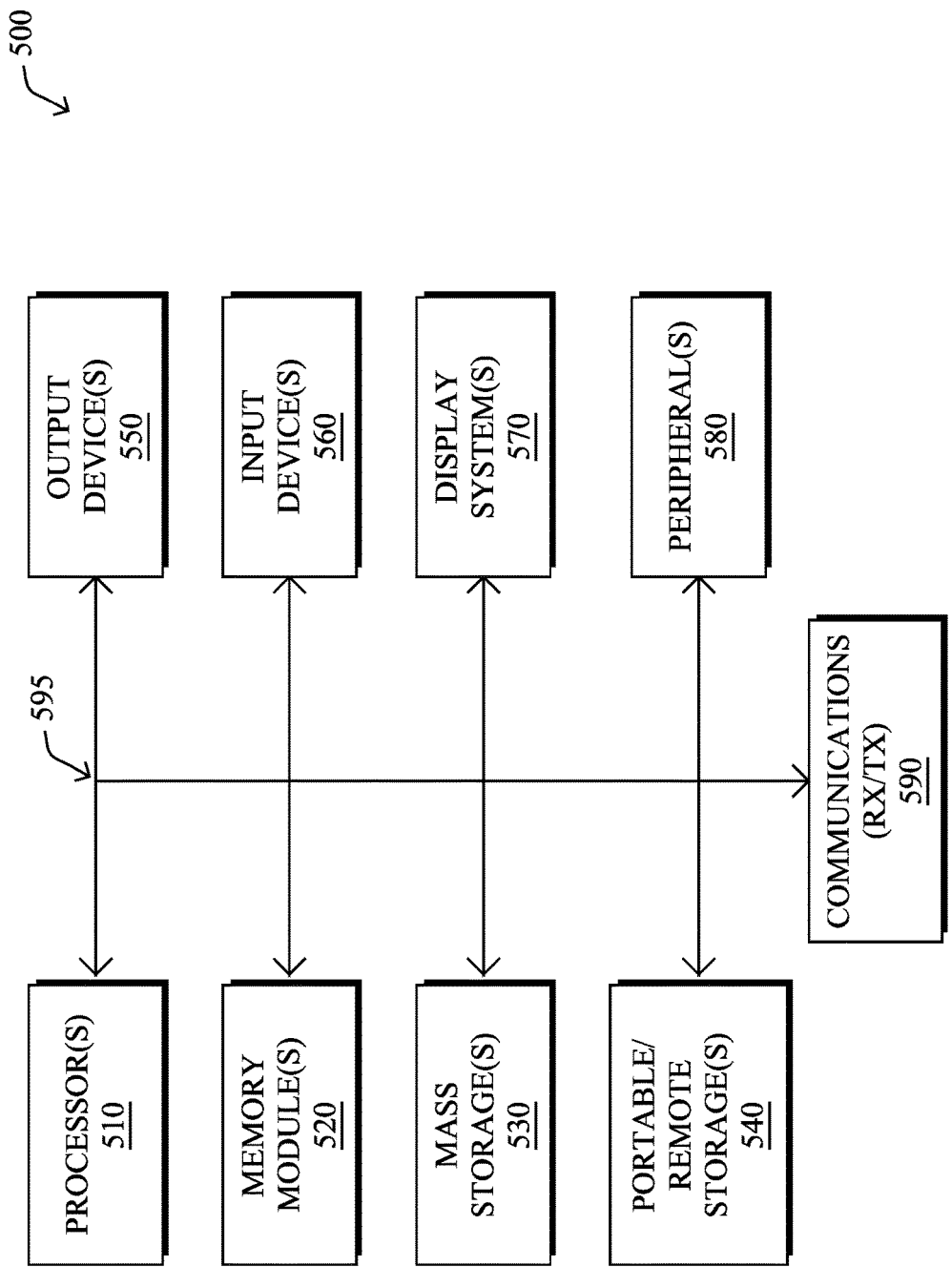
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

Dynamic Circuit Breaker Applications Using a Proxying Agent

New frameworks, many of which being open source, represent a challenge for current instrumentation systems, such as the application intelligence platform described above, as the frameworks become more and more complex and increasingly asynchronous. In particular, there has been a recent growth of microservices in software development, which is a form of service-oriented architecture style (especially used by Java developers) where applications are built as a collection of different smaller services rather than one whole application. If one of those microservices were to stall, fail, or otherwise be or become problematic, tracking down the origin of any end-to-end issues may be difficult and time consuming (e.g., root cause analysis).

As mentioned above, application circuit breakers are a design pattern that prevents "cascading failures" by shutting down transaction components based on extended transaction latency or repeated failures from latency and/or exceptions (failures). Circuit breaker points, which are current hard-coded in application software, are often placed at high-traffic exit points, such that if that portion of code results in a slow-down, gets slower over time, or has a high error rate, then the circuit breaker "trips", such that further requests to that exit point are stopped. That is, rather than pass the request downstream, the circuit breaker declares that portion of the code broken, and can redirect to some other "fallback" such as using cache or another resource, for some amount of time (e.g., for 1-2 minutes) or until some other trigger resets the circuit. This alleviates pressure on downstream elements, which may be used for other services as well, reducing the overburdening of other elements in the network.

In more details, a "circuit breaker", such as Hystrix, monitors the health of a "wrapped" set of code and has the ability to make decisions whether or not that code should not be executed based on collected metrics. By choosing not to execute the code based on previous behavior this will prevent a "cascading failure" situation making the application more resilient. (Notably, the present disclosure may use many terms and structures similar to Hystrix for better understanding since it used by many skilled in the art; however, the techniques herein are equally applicable to any circuit breaker technology, and specific mentions of Hystrix, including commands, classes, syntax, and so on, are meant merely as an example of a readily understood circuit breaker.)

Circuit breakers, such as the illustrative Hystrix circuit breaker, are generally implemented two ways:
1. Manually extending the "HystrixCommand" class (e.g., a "run/fallback" method, which when tripped, runs the fallback such as a cache, error, redirect, etc.):

```
public class FallbackCommand extends HystrixCommand<String>{
private static final String COMMAND_GROUP="default";
private static final Logger logger = LoggerFactory.getLogger(FallbackCommand.class);
public FallbackCommand( ) {
super(HystrixCommandGroupKey.Factory.asKey(COMMAND_GROUP));
}
@Override
protected String run( ) throws Exception {
throw new RuntimeException("Always fail");
}
@Override
protected String getFallback( ) {
logger.info("About to fallback");
return "Falling back";
}
}
```

2. Using an annotation (e.g., the "Spring Framework"—an application framework and inversion of control container for the Java platform):

```
@Service
public class BookService {
private final RestTemplate restTemplate;
public BookService(RestTemplate rest) {
this.restTemplate = rest;
}
@HystrixCommand(fallbackMethod = "reliable")
public String readingList( ) {
URI uri = URI.create("http://localhost:8090/recommended");
return this.restTemplate.getForObject(uri, String.class);
}
public String reliable( ) {
return "Cloud Native Java (O'Reilly)";
}
}
```

In either case, what will happen is that in order to execute these code blocks—a client block of code will instantiate the HystrixCommand class (or other similar class for other circuit breakers) and then execute the monitored method using one of the following methods:

Synchronous—execute( );
Asynchronous—queue( ); or
Observable—toObservable( ).

When the call is made, it will eventually call the HystrixCommand run method which is overridden by the class implementation. The results of that class are monitored for latency and for a runtime exception and metrics stored on each execution. If the latency exceeds a threshold or throws an exception—the execution is considered failed. The circuit breaker (e.g., Hystrix) keeps track of this in metrics, and at some point, depending on the metrics—will/can invoke or "trip" a "circuit breaker" which will not call the "run( )" method anymore for a certain amount of time (in theory, allowing the application to recover and preventing wasted resources and cascade effect).

If a failure occurs or the circuit breaker is invoked—the HystrixCommand "getFallback( )" method can be invoked which allows for some type of fallback action to take place.

Generally, circuit breakers collect a variety of metrics and generates a variety of events that can be monitored for CommandMetrics and ThreadPoolMetrics. In addition, a metric stream can be published to a REST URL that can be consumed by monitoring dashboards (such as the circuit breaker's own dashboard).

Circuit breaker technology can be added to the capabilities of application performance management (APM) systems, such as the application intelligence platform above, but it currently requires the manual addition of third-party libraries and code changes to the application to implement. That is, as also noted above, current circuit breaker technology is primitive, and requires "wrapping" of methods, manual integration, manual configuration of what is controlled by the circuit breaker and how it should be controlled, and so on. Further, as mentioned above, circuit breaker technology is currently required to be integrated in the application, thus being very persistent and troublesome when issues and instabilities are discovered.

For developers today the challenges with implementing circuit breakers are many, for both APM environments and any software application, generally. For instance:

Circuit breakers are difficult to get into legacy code quickly without regressions (That is, the code works already, and changes to the code could break it);

It is difficult to determine what/where are the critical functions that need a circuit breaker;

It is difficult to get circuit breakers into third party libraries that have no such functionality;

Development effort is high to ramp up and implement a commercially available circuit breaker—typically a large investment in terms of coding overhead;

There is no easy ability to control whether the functionality is operational without manually adjusting the code, particularly given the number of circuit breakers in a given application (e.g., found in upwards of 30-50 places within a given application code);

The only way to test operation of a circuit breaker on application code is to write it into the application code, thus if the circuit breaker is or becomes unstable, the entire application code becomes unstable as well.

The techniques herein address these concerns and more, by providing dynamic circuit breaker applications using a proxying agent (e.g., a Java agent), making circuit breaker implementation more advanced, more robust, and more controllable. That is, the techniques herein provide a circuit breaker implementation that is both dynamic and effective, and eliminates the need for coding or including circuit breaker code in the application itself. Said differently, as described below, the techniques herein provide a circuit breaker framework that can be applied with no code changes to the application, no integration into the application (e.g., with full learning of where and how to apply it), and makes circuit breakers completely dynamic in terms of enabling/ disabling the functionality as needed (and on a per-method basis). Additionally, the techniques herein provide a circuit breaker implementation that is not permanent, i.e., is performed in memory, and not in code (or stored on a disk). As detailed below, a circuit breaker proxy agent provides the "weaving" that allows circuit breaker technology to make the move from a fairly static, manually implemented framework to something that can be very dynamically automated using application intelligence.

Specifically, according to one or more embodiments described herein, a proxying agent loaded at an application startup loads a circuit breaker framework into a class loader, and also loads a circuit breaker proxy into an extension class loader seen by the proxying agent and by the application. The proxying agent may also instrument selected methods of the application, such that the following may occur in response to a call to run an instrumented method. In particular, an identifier (ID) of the circuit breaker proxy may be set to a trackable context, and the proxy execution may be held until exit of the run method. Notably, if exit of the run method is due to a particular exception, an exception of the proxy may also be set to reflect the particular exception. According to the techniques herein, the circuit breaker may then monitor the proxy for latency, exceptions, and circuit breaker trip criteria, and stops the run method in response to the latency, exceptions, or circuit breaker trip criteria surpassing a particular respective threshold.

Operationally, and as described in greater detail below, the techniques herein take circuit breakers to the next level:

Dynamic in every sense using runtime code injection;
Self-tuning of what the circuit breaker parameters need to be;
Automates the process of identifying what needs a circuit breaker;
Automatically integrates the circuit breaker infrastructure;
Creates learning, test mode, dynamic on/off capabilities; and
Provides many other features and advantages, described below.

In particular, the techniques herein apply the dynamic nature of Java agents to circuit breaker technology using innovative proxying techniques for both initialization of the system as well as during application runtime. (Note that the techniques herein often refer to, or use terminology specifically related to, Java agents and/or Hystrix circuit breaker technology—However, the techniques herein can be applied to other types of "proxying agents" and to all circuit breaker technologies, and any references herein to Java agents or Hystrix are merely an example that is not meant to be limiting to the scope of the present disclosure.)

Figure 6:
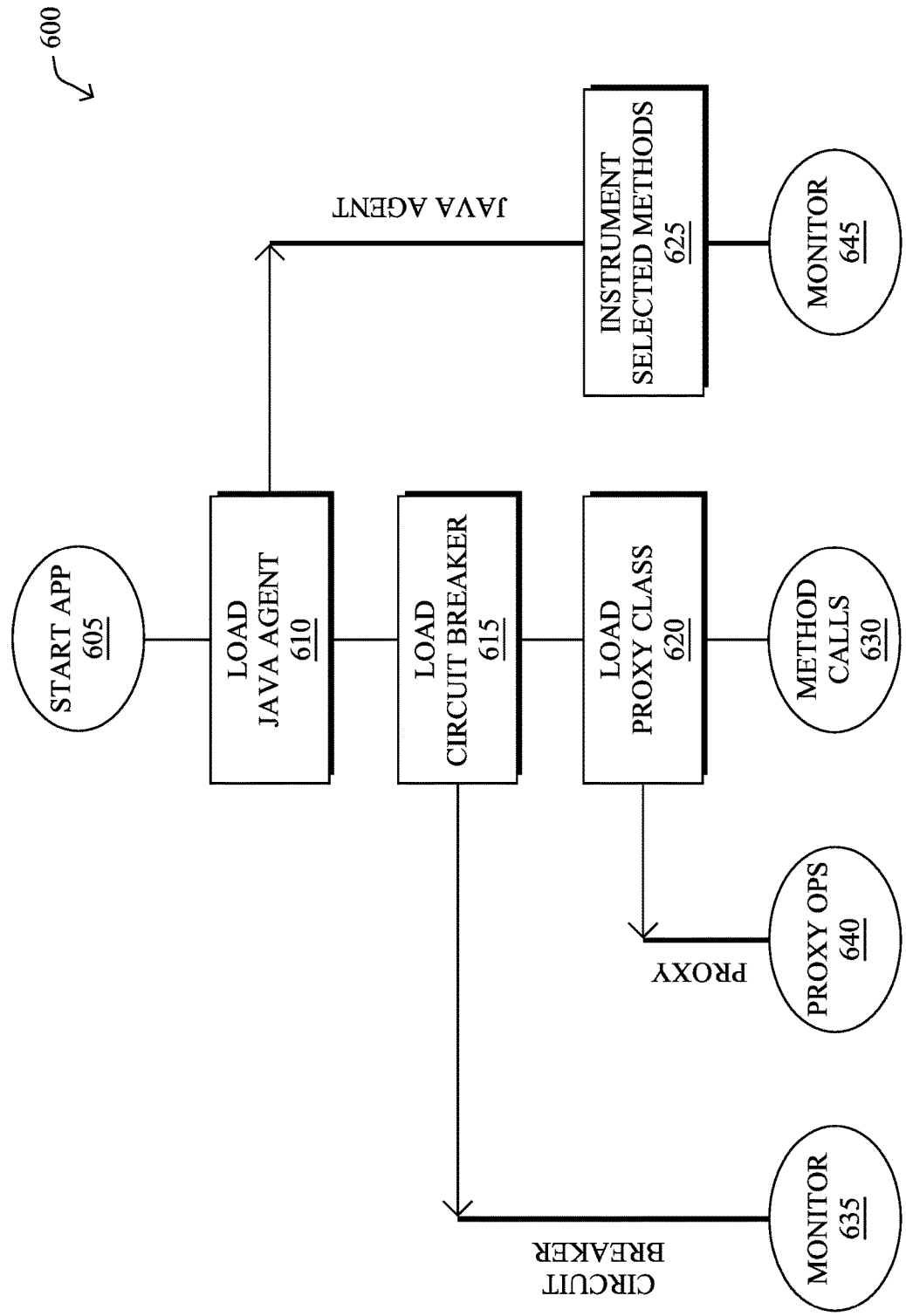
FIG. 6 illustrates an example simplified procedure for initializing the dynamic circuit breaker applications using a proxying agent in accordance with one or more embodiments described herein.

With reference generally to flowchart 600 of FIG. 6, the techniques herein implement initialization as follows:

First, at application startup in step 605, a Java Agent is loaded in step 610 (e.g., a variant of the APM agents described above, a lightweight Java agent (e.g., Simple Class Instrumentation Agent (using Javassist)), or any so-configured "circuit breaker proxying agent").

In step 615, the circuit breaker is then loaded to the application. In particular, during startup, the Java agent will either load its own version of a circuit breaker into the application (e.g., into the Application Class Loader), or the agent may use the existing Application's already loaded circuit breaker framework. Said differently, the Java agent contains a version of the circuit breaker, but may first check whether a circuit breaker is already loaded in the application. If so, then it will use that version of the technology, but if not, then the agent will load its own circuit breaker core into the Application base. Note also that loading the circuit breaker may also comprise dynamically registering the circuit breaker event-stream and dashboard into the Application Servlet Container to be accessed, as described below.

According to certain embodiments herein, after verifying the circuit breaker is loaded, the Java agent may then load itself (and interception technology) into an isolated ClassLoader invisible to the application.

In step 625, the agent loads a "Proxy" into an Extension ClassLoader which is "seen" by both the Application Classes and the Agent Classes (via delegation). That is, the Java agent loads a circuit breaker proxy class which can communicate with the agent (which is in the isolated class loader invisible to the applications) and the application (thus visible to the circuit breaker), thus being built between the circuit breaker of the application framework and the java agent. The proxy may be created to a Circuit Breaker Command (e.g., HystrixCommand) structure that is understood by the circuit breaker, for example, where the proxy class has a single Circuit Breaker Command implementation with "run" and "getFallback" methods (adhering to circuit breaker specifications). Note that the circuit breaker command proxy maps the circuit breaker command (e.g., HystrixCommand) to Java agent proxy entry/exit handlers.

In step 625, the Java agent instruments statically and automatically locates which methods need to instrumented so that they will call into the Java agent proxy entry/exit handlers. For instance, the agent finds and locates Circuit Breaker candidates, such as based on annotations (e.g., specified via class/method annotation), specification of Class/Method (e.g., specified via class/method/signature), or else all outbound exit points (e.g., Web Service calls, Raw Sockets, JDBC, etc.). These selected circuit breaker candidate methods are instrumented at the entry point and all exit points in the code. Essentially, anything can be instrumented and then monitored by the circuit breaker—the best candidates being methods of high latency or failures (like Exit Points). In addition, circuit breaker properties can be associated with each instrumented method that dictate when/how a circuit breaker is invoked (e.g., using HystrixCommand-.Setter).

Now that the system is initialized, the application waits for method calls (630), which can then be monitored by the circuit breaker (635), though in actuality the circuit breaker is monitoring the proxy operations (640) (e.g., latency, repeated failure, exceptions, etc.), and the Java agent is monitoring this and other aspects of the application method (645), as described below.

Figure 7:
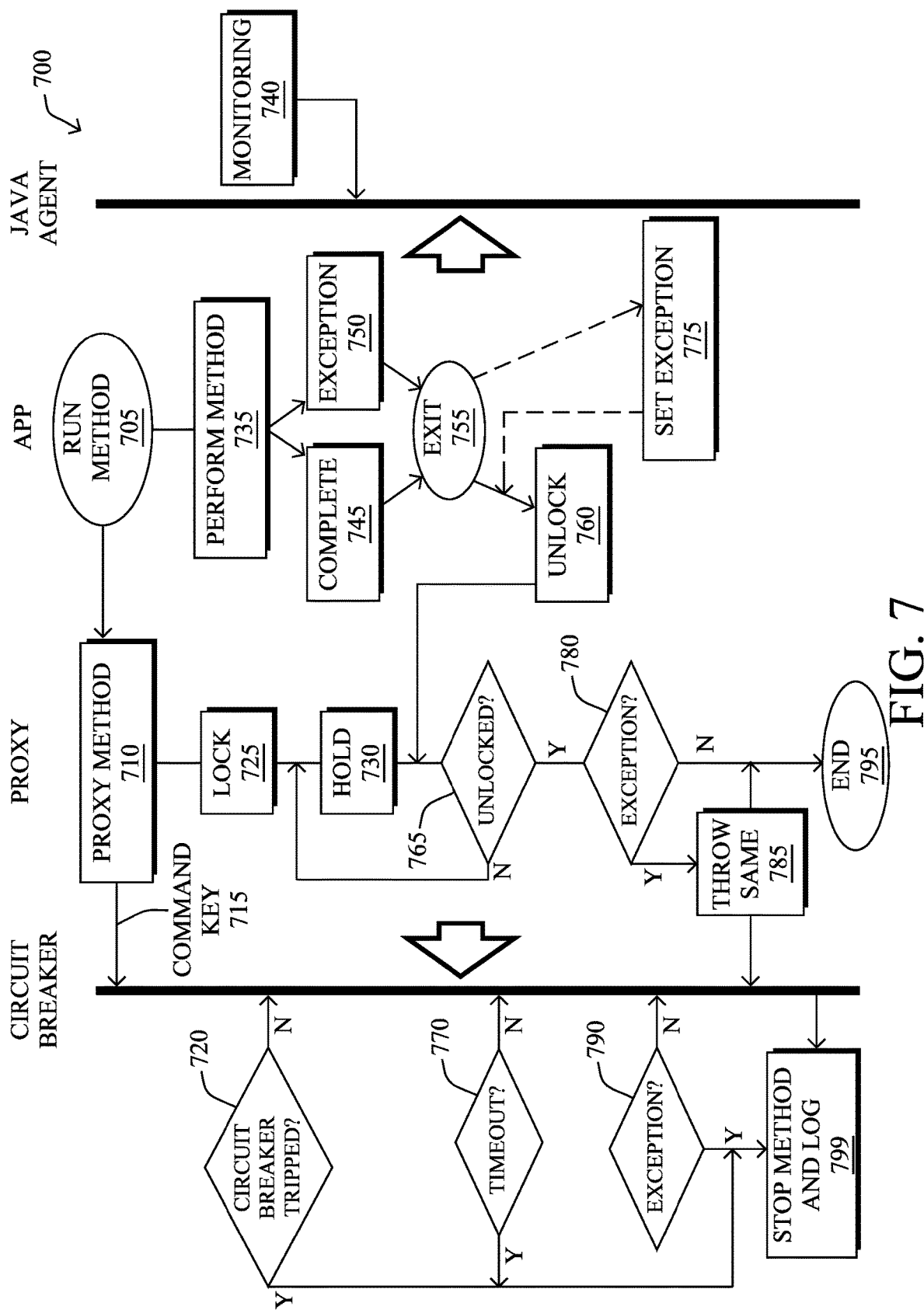
FIG. 7 illustrates an example simplified procedure for implementing runtime of the dynamic circuit breaker applications using a proxying agent in accordance with one or more embodiments described herein.

In particular, according to one or more embodiments of the techniques herein, the runtime operation of the system may be illustratively implemented in a manner as described below with reference generally to flowchart 700 of FIG. 7.

As shown, when a circuit breaker method (an instrumented method) is called in step 705, the techniques herein intercept it and pass the method to the proxy class to essentially create a façade for the circuit breaker with a proxy method 710. Specifically, in one embodiment, entry/ exit handlers create an exit point name (e.g., if a URL—the exit point name is the URI of the URL, etc.) that is passed to the proxy, which uses a "singleton" instance of a Circuit Breaker Command class. (Note that conventional circuit breakers would here have to wrap the method in this class—coding it—one per Circuit Breaker point). The circuit breaker command proxy "tweaks" the underlying circuit breaker command tracking such that it tracks metrics/context based on whatever context configured for the particular environment and/or by an administrator (e.g., a business transaction name, other contexts, etc.). This technique is used to trick the circuit breaker technology into believing that it has multiple instances—but only the singleton is used (e.g., tricking the circuit breaker into believing there are really, say 50 circuit breaker instances, but really there is only one, since circuit breakers often need each class to have a separate circuit breaker, tracked individually). In one illustrative embodiment, this may be accomplished by dynamically changing the "commandKey" 715 to be the "exit point name", e.g., to also align with APM tools and associated monitoring and tracking. Said differently, when the instrumented method is called—the HystrixCommand instance is created and a CommandKey can be set based on class/method name, or in the case of an ExitPoint (e.g., Outbound web service calls)—the actual URL or inbound business transaction ID. This key is dynamically set and used to track metrics, etc. on a per-instance basis—depending on preference.

Now that the system has entered an instrumented method (i.e., one the system wants to monitor with a circuit breaker), and the run method is being emulated by the proxy in that class (i.e., where the circuit breaker is prepared to monitor), then in step 720 the circuit breaker core architecture begins implementing its full capabilities (e.g., circuit breaking, metric tracking, etc.), where the tracking is specifically based on the provided context (e.g., as shown below in the dashboard).

At this time, the intercept (methodEntry) takes out a lock in step 725, placing the proxy in a hold position 730. For example, the method execution takes place based on type of circuit breaker execution selected:

Sync—call execute( );
Async—call queue( ); or
Observable—call toObservable( ).

That is, as part of the method entry, the agent calls either the "execute", "queue", or "toObservable" which begins the execution of the proxy run—however, that "proxy run" immediately blocks waiting for a lock to be released.

Eventually the execution of the "real" run method occurs in another thread (e.g., a Thread Pool) in step 735, which is monitored by the Java agent (740) until either completion (745) or an exception (750). At the same time, the proxy run( ) command waits for the lock to be available, where once the intercept exit is called (755), then the exit is done, releasing the lock (unlocking 760), and the hold 730 completes once the lock is released, accordingly. Note that during the execution of the method and thus during the held proxy, the circuit breaker is detecting whether a latency has breached some timeout value (step 770).

In one embodiment herein, when the instrumented method is exiting, it may also check to see whether the exit is due to an Exception, and if true, it will set that Exception in the "Proxy" class in step 775—then the lock is released and the "run" method resumes. If the proxy run method sees an "Exception" set in step 780 then it will rethrow that Exception in step 785, which will then be picked up by the circuit breaker monitoring system in step 790. Otherwise, it will complete (step 795)—the "run" method latency should match (mimic) the latency found in the method execution. Essentially what this does is makes the circuit breaker "mimic" the latency and catch any Exception for the intercepted method without requiring wrapping that method in code (i.e., the circuit breaker "thinks" something was occurring for the same latency as it actually takes to occur, and can track/log and operate for latency timeouts, exceptions, and circuit breaker tripping, accordingly, in step 799).

It is important to point out that the circuit breaker platform herein not only provides circuit breaker advantages (latency, circuit breaker tripping, exception handling, and so on), but that it also collects metrics from both the circuit breaker (e.g., those latencies, errors, and so on) as well as the agent's metrics own metrics as configured. As described further below, such metrics may be exposed via JMX (Java metric tracking—converting circuit breaker outputs into consumable metrics) or other dashboard that may allow not only metric visibility, but also dynamic administrator control for the many features and settings. For example, because the methods are part of instrumentation controlled (or "proxied") by the agent, the agent can create scenarios like "test mode", "learn mode", and even a "kill switch" that is not possible under the current implementations of circuit breakers.

Additional advanced features are also presented herein as optional embodiments based on the techniques herein. For example, the techniques herein can be configured to learn and recommend where to implement the circuit breakers. For instance, the platform herein can look for "exit points", similar to how APM would work to locate Web Services, JDBC, JMS, or any outbound network call, and so on. Other places to look for to configure a circuit breaker may be configured by administrators or determined through machine learning (e.g., watching applications for common problem areas, key/important methods, frequently used methods, etc.). Illustratively, such learning can use stack sampling to identify latency "hotspots", exception monitoring to identify exception "hotspots", APM tracing technologies to instrument "exit" and "entry" points, and further techniques that may be appreciated by those skilled in the art.

Further processes can be used to learn and dynamically set the circuit breaker thresholds (latency timeouts, failure counts, failure percentages, etc.). For instance, one piece of information from which the system can learn is by looking at outbound exit calls. In particular, a grace period can be established by disabling the circuit breaker, so that the system can record latencies for some "x" amount of time requiring some "y" amount of samples. Once this grace period is over, the techniques herein can set each circuit breaker (individually or collectively) based on a percentile average of latency discovered, or based on sharp drop offs of "normal" latency and "non-normal". The techniques herein can also automatically learn what an appropriate timeout is and apply it based on specified criteria, and the timeouts can also be mapped specifically to business transactions and/or anything that can be seen in the application flow (i.e., context).

Additionally, the techniques herein allow for the ability to implement circuit breakers in any class/method (legacy, third party, etc.) without any code changes or need for source code (that is, standard BCI performs these changes at runtime). The techniques also provide for dynamically enabling or disabling the technology (e.g., for escalations, investigations, as-desired, auditing, etc.), simply by disconnecting the instrumentation from the circuit breaker command proxy.

As an additional feature offered by the techniques herein, the platform herein allows for incorporation of a "test mode" that can be used before full deployment to see what the circuit breaker configuration would do. That is, the techniques herein allow the circuit breaker to do everything except interrupt a transaction or short circuit/trip. In this manner, the techniques herein can generate reports on what the circuit breaker behavior is through a log file, without having had to break down any operation of the application (e.g., particularly useful for applications already deployed and in use).

Moreover, as shown below, the techniques herein can automatically insert the circuit breaker metrics and dashboard into the application runtime (classes, class loader, etc.), e.g., using the capabilities of Dynamic Servlet registration.

Lastly, in addition to application performance monitoring and management, other verticals may take advantage of the techniques herein, such as third-party applications, performance tools, or security products. In particular, the techniques herein allow access to control dynamically tripping the circuit breakers in the application, such as according to meeting some threshold before short circuiting the circuit breaker that is not necessarily related to latency, failures, or exceptions (e.g., security mechanisms, denial of service (DoS) attacks, anomaly detection, etc.). Accordingly, any number of outside controls on circuit breakers are thus provided by the dynamic platform described herein.

Notably, according to the techniques described herein, the circuit breaker proxy can beneficially adjust a lager number of properties than conventional circuit breakers (e.g., as "HystrixProxyHandlerMethodProxy.properties"). For instance, though some have been mentioned above, the following standard circuit breaker properties can be set:

hystrix.proxy.executeRequestTimeout=1000 (How long before Timeout);
hystrix.proxy.enableCircuitBreaker=true (Allow circuit breaker to short circuit);
hystrix.proxy.windowTime=30000 (Rolling window time);
hystrix.proxy.circuitOpenRequestPctFail=10 (Percent of requests to fail in a window before short circuit);
hystrix.proxy.circuitOpenMinRequestsNeeded=3 (Number of requests you have to have before a short circuit); and
hystrix.proxy.circuitOpenRecoverTime=300000 (How long before a circuit breaker will recover from short circuiting state).

In addition to these circuit breaker standard configurations, the circuit breaker proxy herein further allows for the following configurations:

hystrix.proxy.log.instances=true (Log circuit breaker instances to log file);
hystrix.proxy.log.failures=true (Log circuit breaker execution failures to log file);
hystrix.proxy.log.events=true–(Log circuit breaker events to log file);
hystrix.proxy.forward.events=http;//host:port/hystrix-events (Where to forward circuit breaker events);
hystrix.proxy.classloader=extension (Where to put the circuit breaker classes (extension or system));
hystrix.proxy.debug=false (Debug enabled);
hystrix.proxy.load.hystrix=true (Should agent load circuit breaker classes or use existing application's classes);
hystrix.proxy.execute.async=true (Should agent used async or sync circuit breaker executions);
hystrix.proxy.test.mode=false (Should agent operate in test mode and display what would happen but not affect application);
hystrix.proxy.enable.hystrix=true (Should agent enable circuit breaker at startup);
hystrix.proxy.interrupt.on.timeout=true (Should agent interrupt a transaction if it times out); and hystrix.proxy.learn.timeout.samples=–=(Should agent "learn" what the timeout values should be and how many samples before agent sets it).

Turning now to a demonstration of the techniques herein, FIGS. 8-11 illustrate a series of demonstrations of circuit breaker operation once the proxy agent is installed and operational as described above. For instance, the following syntax may be used for the invoking various circuit-breaker-monitored operations:

1. Execute the Config Based Method—
   http://localhost:8088/HystrixProxyDemoServlet/configbased[&wait=ms][&throw=Exception (this is a standard method that was instrumented via named rule—exception or latency can be specified);
2. Execute the Annotation Based Method—
   http://localhost:8088/HystrixProxyDemoServlet/annotatedbased[&wait=ms][&throw=Exception—(this is a standard method instrumented via class/method specified annotations—exception or latency can be specified); and
3. Execute the Config Based Method—
   http://localhost:8088/HystrixProxyDemoServlet/connect=url (this is all outbound web service connections—any url can be specified).

According to the demonstration, first a normal operation with circuit breaker monitoring, namely:
   "http://localhost:8088/HystrixProxyDemoServlet/execute?configbased&wait=800".

Assuming the timeout for execution is set at 1000 ms (default)—this operation would be deemed "normal", since it completes in 800 ms (i.e., before the timeout). FIG. 8 illustrates an example of a circuit breaker log 800 showing that this operation is considered normal. That is, the circuit breaker proxy may have a log (e.g., located at prod/javaagent.log)—and properties (set by default) that log the circuit breaker instance, any events, and/or failures. Thus, as can be seen with a basic understanding of the log output in FIG. 8, no errors have occurred, and execution is complete.

Now, assume that a command is executed that goes beyond the circuit breaker timeout setting (of 1000 ms), namely:
   "http://localhost:8088/HystrixProxyDemoServlet/execute?configbased&wait=10000".

What is interesting here is that this was a call that should take 10 seconds, but it only takes 1 second. As shown in FIG. 9, by examining the log 900, the circuit breaker timed out the call ("event type is TIMEOUT")—forcing it to end at 1 second—which is why it returned after 1 second (1010 ms) versus 10 seconds.

As another demonstration, assume execution of a command that throws an Exception, such as:
   "http://localhost:8088/HystrixProxyDemoServlet/execute?connect=https://bad.bad.bad".

With reference FIG. 10, the circuit breaker log 1000 now shows that the circuit breaker noted the failure of the execution and the Exception involved (e.g., the bad.bad.bad UnknownHostException).

Thus far, the circuit breaker has not tripped open, so next as a demonstration, assume that the following failing command is repeated (and failed) at least four times (three times consecutively or within a rolling window of time in order to trip the circuit breaker per default setting):
   "http://localhost:8088/HystrixProxyDemoServlet/execute?configbased&wait=10000".

Now, after the third failure, the fourth command returns back immediately, as shown in FIG. 11 and log 1100. In particular, the circuit breaker "short circuited" (tripped) after the third failure—such that it does not even bother to call the real method after the circuit breaker has tripped—instead, it called the Fallback method (which might return cached data, etc.). The circuit breaker will remain "short circuited" until the setting to recover (based on time period or otherwise) has been realized.

According to one or more embodiments herein, it is important to note that a circuit breaker metric stream servlet and dashboard may also be automatically installed. In particular, the circuit breaker will stream metrics, and by the default—the circuit breaker proxy agent can provide this stream in raw format (e.g., directing the stream to a browser); however, since the raw data itself is generally "unreadable", the platform herein consumed the data and output it to a circuit breaker "dashboard" (e.g., a graphical user interface (GUI) interpreting and presenting the data in a readable format). FIG. 12, for example, illustrates an example dashboard 1200 containing portions representing circuits 1210, and thread pools 1220, among other portions that may be configured as desired. Note that because the techniques herein allow for changing the identifier of the circuit breaker on-the-fly (e.g., dynamically injecting the command key), any number of tracked interaction instances (e.g., business transactions) can be set as circuits 1210, which may be aligned with whatever naming convention used or useful to administrators (e.g., APM naming). Each circuit can be shown to be in either a closed (functional) or open (tripped) state. Various metrics, such as mean latency, active threads, queue size, and so on may also be contained and sorted within a dashboard, though those shown in FIG. 12 are merely meant as a demonstration of how circuit breaker metrics can be presented in a readable manner.

Figure 13:
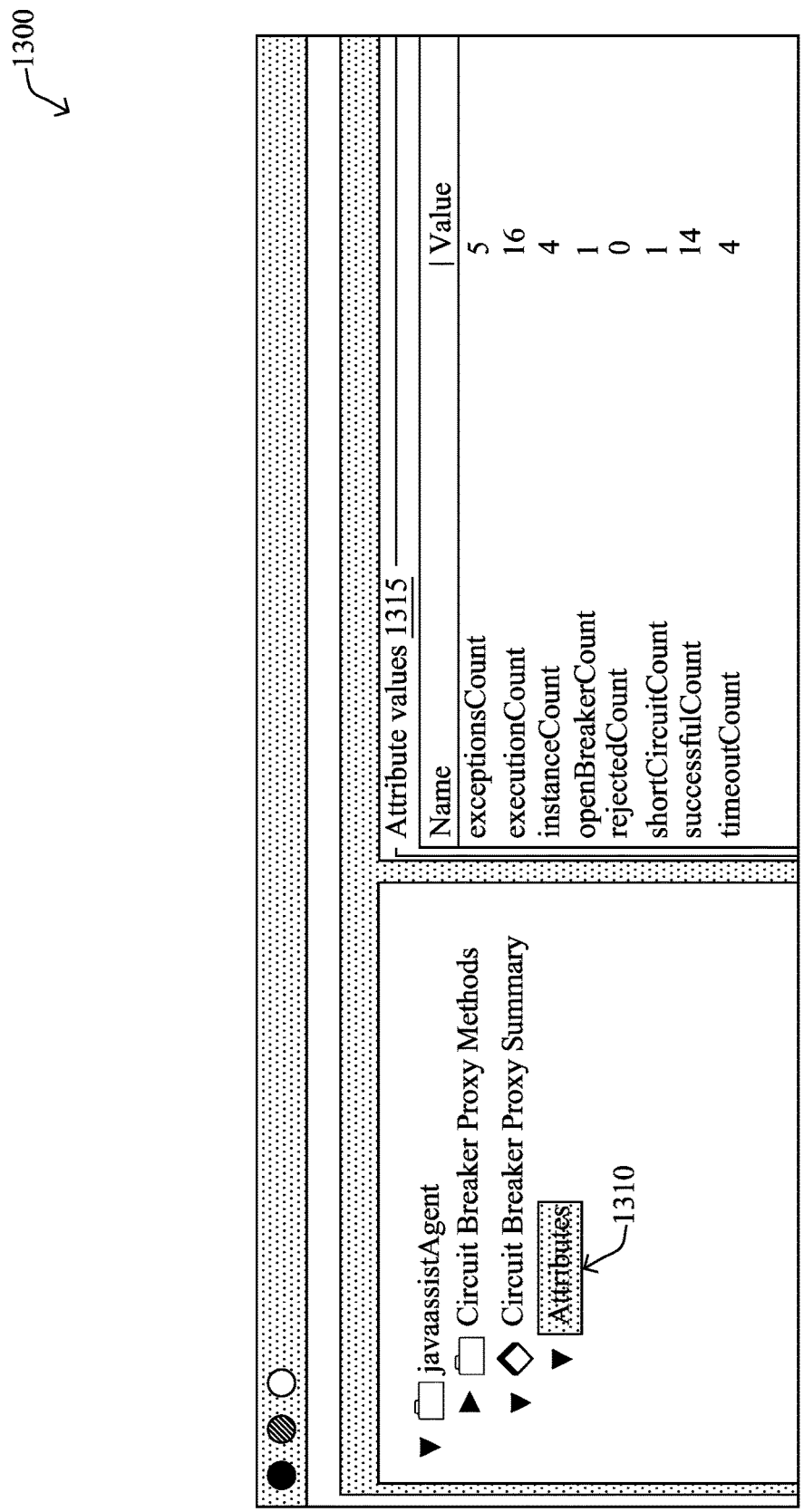
FIG. 13 illustrates an example display of a summary of proxy agent and circuit breaker operations.
Figure 14:
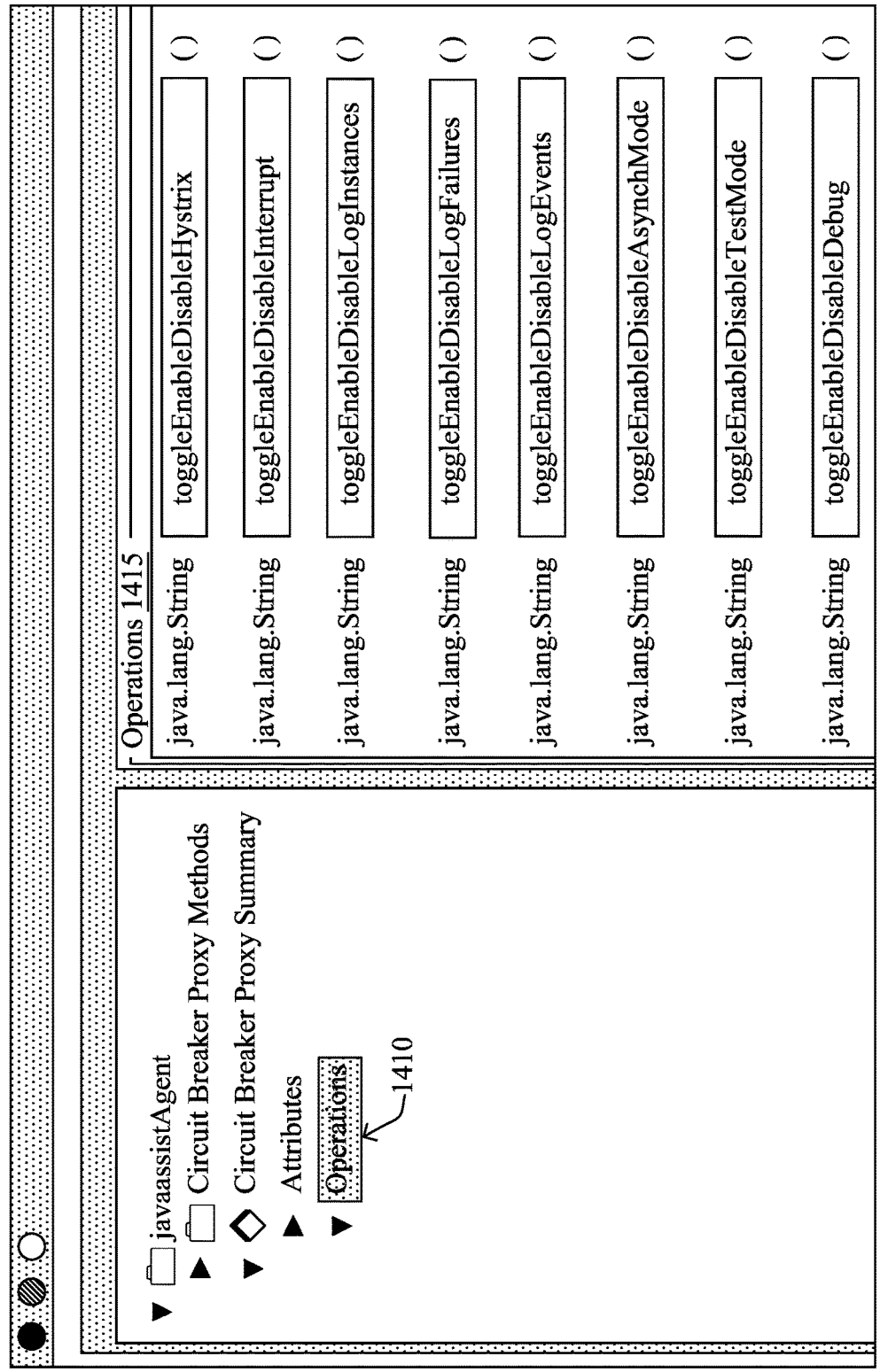
FIG. 14 illustrates an example display of command options for a circuit breaker proxy.
Figure 15:
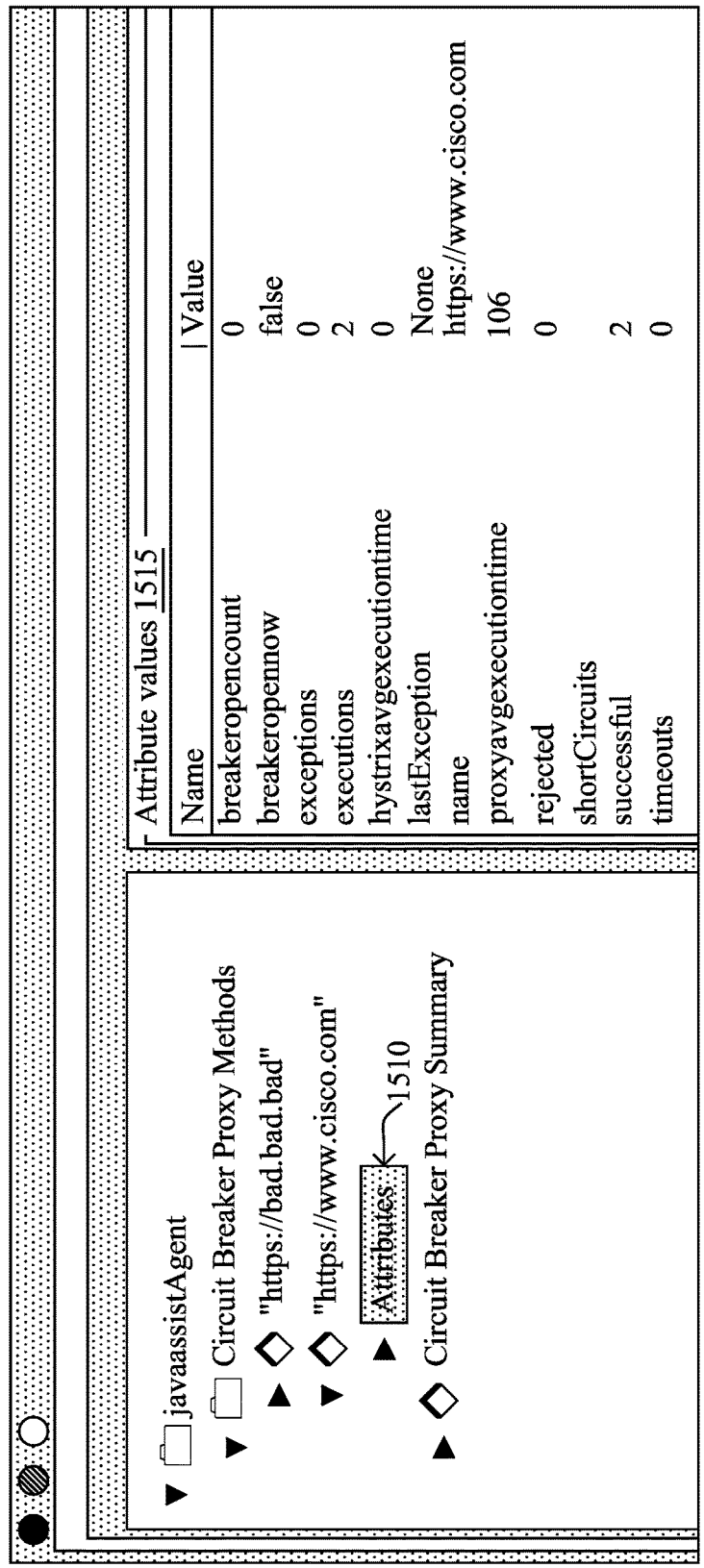
FIG. 15 illustrates an example display of a summary of proxy agent and circuit breaker operations for a monitored instance.

Other GUIs for displaying metrics or controlling configurations may also be configured according to the techniques here, such as those shown in FIGS. 13-15, among others. For instance, FIG. 13 illustrates an administration GUI 1300 and how a circuit breaker proxy summary selection 1310 can show a number of attribute values 1315, summarizing proxy agent and circuit breaker operations, such as, e.g., exceptionsCount, executionCount, instanceCount, openBreakerCount, rejectedCount, shortCircuitCount, successfulCount, timeoutCount, and so on (each of which being generally understood by those skilled in the art). Additionally, as shown in FIG. 14, the GUI (now view 1400) can provide, illustratively via operations selection 1410, command options 1415 to "dynamically" control the circuit breaker (which, notably, is not available in current circuit breakers without the agent proxy of the present disclosure). Example commands may include such things as: toggling (enabling/disabling) the circuit breaker, toggling the circuit breaker's ability to interrupt, toggling logging of instances, toggling logging of failures, toggling logging of events, toggling async mode, toggling test mode, toggling debug mode, and so on. Lastly, as shown in FIG. 15, GUI view 1500 illustrates that selection of a "circuit breaker proxy methods" option 1510 provides a summary (attribute values 1515) of proxy agent and circuit breaker operations for a particular monitored instance. For example, attributes such as breaker open count, breaker open now, exceptions, executions, circuit breaker average execution time, last exception, name, proxy average execution time, rejected count, short circuits, successful completions, timeouts, etc.

Figure 16A:
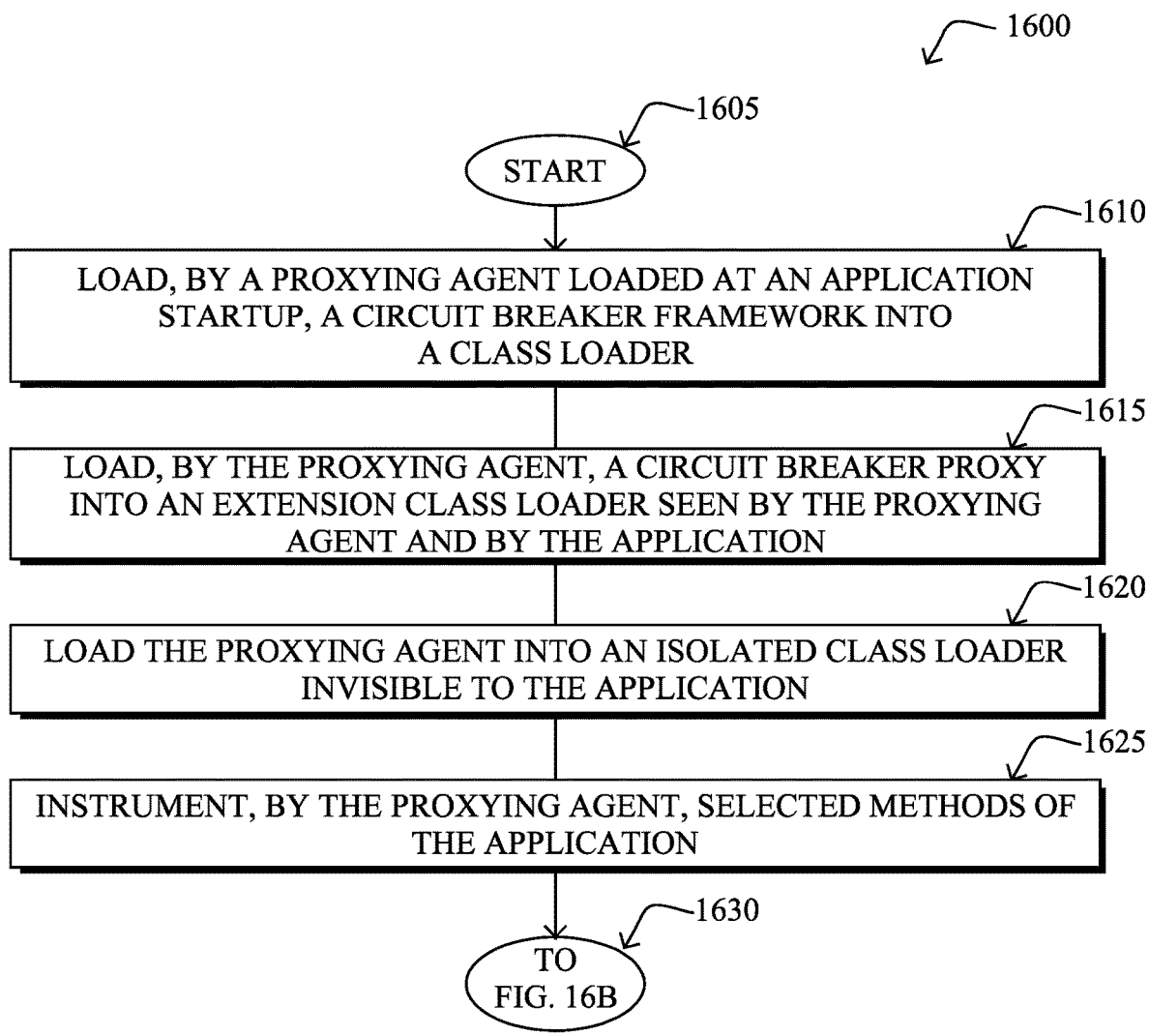
FIGS. 16A-16B illustrate another example simplified procedure for dynamic circuit breaker applications using a proxying agent in accordance with one or more embodiments described herein.
Figure 16B:
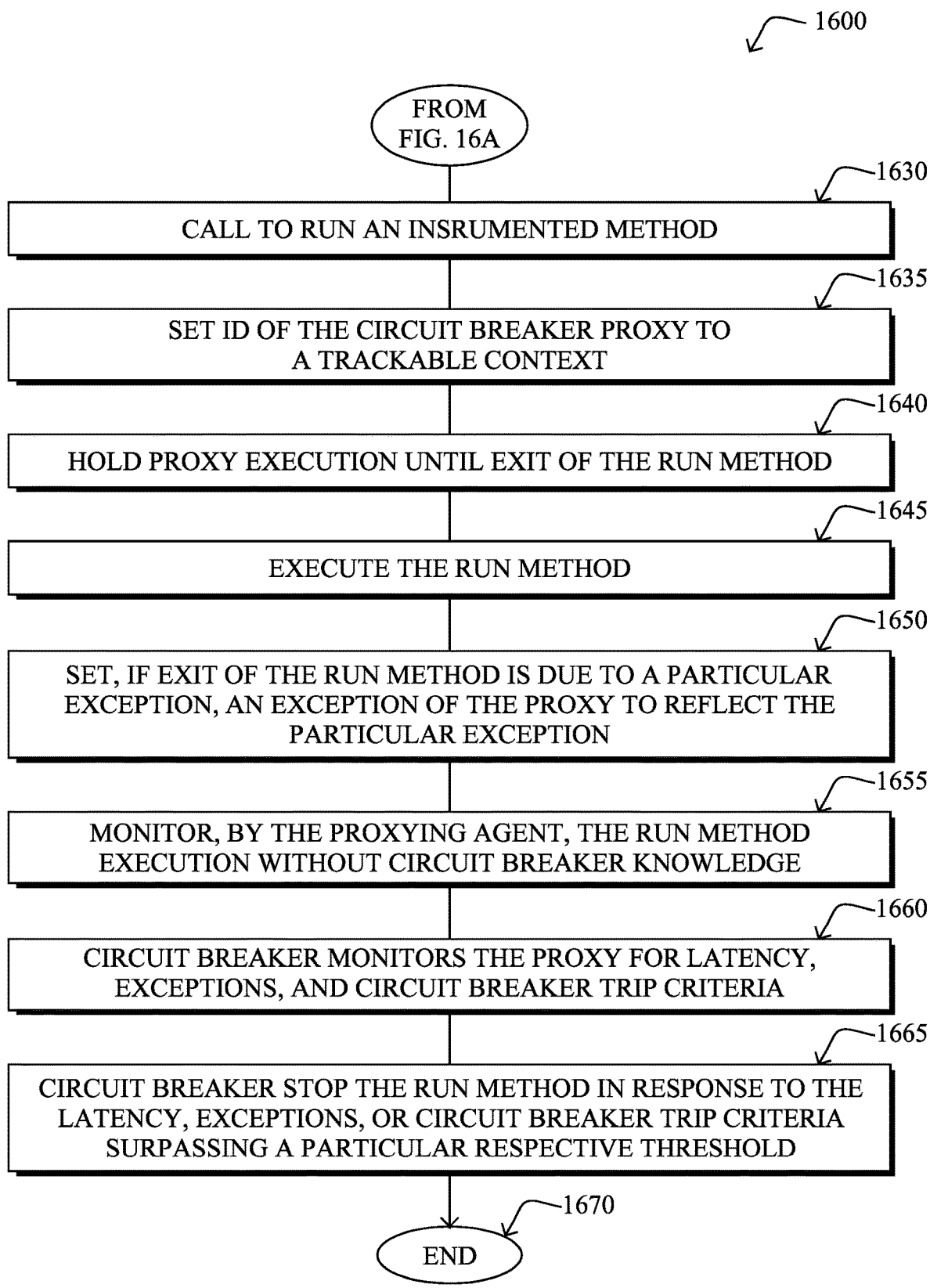

In closing, FIGS. 16A-16B illustrate an example simplified procedure for dynamic circuit breaker applications using a proxying agent in accordance with one or more embodiments described herein. For example, a non-generic, specifically configured device (e.g., device 200, such as a server/controller) may perform procedure 1600 by executing stored instructions (e.g., process 248, such as a circuit breaker proxying agent process). The procedure 1600 may start at step 1605, and continues to step 1610, where, as described in greater detail above, a proxying agent (e.g., Java agent), loaded at an application startup, loads a circuit breaker framework (e.g., Hystrix) into a class loader. As noted above, the proxying agent may first determine whether the application has a native circuit breaker preinstalled, and may use the native circuit breaker as the circuit breaker framework. In step 1615, the proxying agent also loads a circuit breaker proxy into an extension class loader seen by the proxying agent and by the application. In step 1620, the proxying agent may load itself into an isolated class loader invisible to the application. Furthermore, in step 1625, the proxying agent may instrument selected methods of the application, such as by first finding circuit beaker instrumented method candidates based on one or more of annotations, specifications of class/method, and outbound exit point identification, as described above.

Turning to FIG. 16B, in response to a call to run an instrumented method in step 1630, an identifier (ID) of the circuit breaker proxy may be set in step 1635 to a trackable context (e.g., creating an exit point name for the trackable context of run method, passing the exit point name to the circuit breaker proxy, and setting a command key for the circuit breaker to be the exit point name, as detailed above). Then, in step 1640, execution of the proxy is held until exit of the run method. In particular, in one embodiment as described above, this may entail locking operation of the circuit breaker proxy upon starting the run method, and unlocking operation of the circuit breaker proxy upon exit of the run method.

Execution of the run method may occur in step 1645, generally in parallel with the proxy being held (e.g., in another thread), and may, as mentioned above, take place based on a circuit breaker execution selected from a group consisting of: synchronous, asynchronous, and observable. If exit of the run method is due to a particular exception, then in step 1650 an exception of the proxy may be correspondingly set to reflect the particular exception.

During the process operation, shown in step 1655, the proxying agent may also be monitoring the run method execution without circuit breaker knowledge.

In step 1660, according to the techniques herein, the circuit breaker monitors the proxy for latency, exceptions, and circuit breaker trip criteria, and then in step 1665 may stop the run method in response to the latency, exceptions, or circuit breaker trip criteria surpassing a particular respective threshold. Note that as described above, one or more fallback configurations to perform may be set in response to stopping the run method by the circuit breaker. Also, as described above, the techniques herein may learn and set one or more circuit breaker thresholds based on metrics discovered during a learning period, or may set the one or more circuit breaker thresholds based on one or more user-specified criteria.

The illustrative and simplified procedure 1600 is shown ending in step 1670, though notably with the ability to run additional instrumented methods (step 1630) for circuit breaker operation and metric monitoring. Note further that other steps may also be included generally within procedure 1600, such as additional steps or more generally, as additions to steps already specifically illustrated above, and the procedure as shown is merely a simplified example of the techniques herein. For example, such steps may include: dynamically disconnecting instrumentation of one or more particular instrumented methods to disable circuit breaker monitoring of the one or more particular instrumented methods; enabling a test mode by disabling circuit breaker stopping of the run method; setting the one or more circuit breaker thresholds according to one or more security criteria; generating reports and GUIs (e.g., dashboards); and so on.

It should be noted that while certain steps within procedures 600, 700, and 1600 may be optional as described above, the steps shown in FIGS. 6, 7, and 16A-16B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600, 700, and 1600 are described separately, certain steps from each procedure may be incorporated into each other procedure, and the procedures are not meant to be mutually exclusive.

The techniques described herein, therefore, provide for dynamic circuit breaker applications using a proxying agent. In particular, the techniques herein provide a tool that can automate and dynamically integrate circuit breakers into any application (including legacy code or binary code (e.g., third-party libraries) without access to the source) quickly and accurately, and without requiring any changes to the application code, nor installation of any particular circuit breaker application (e.g., Hystrix). That is, the adoption rate for circuit breakers can be increased by "automating" the integration of a very key framework in a unique manner while increasing developer's time-to-market capabilities and making their applications more resilient with a high rate of redundancy. The techniques herein further provide additional functionality beyond traditional circuit breakers, such as automatically learning what critical areas of code need to be monitored by the circuit breaker and what criteria should be used for the circuit breaker, providing test runs of application code and modifications to the code, offering global security enhancements, and including mapped/annotated circuit breakers in application monitoring flowmaps (e.g., "annotations" or "decorations" indicating where circuit breakers are located and what their status is).

In still further embodiments of the techniques herein, a business impact of applications affected by circuit breakers can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can track and correlate the timeouts, exceptions, and circuit breaking with various business transactions in order to better understand the effect on the business transactions, accordingly.

Illustratively, the techniques described herein may be performed by hardware, software, and/or firmware, such as in accordance with the illustrative circuit breaker proxying agent process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

While there have been shown and described illustrative embodiments above, it is to be understood that various other adaptations and modifications may be made within the scope of the embodiments herein. For example, while embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Additionally, the present disclosure has specifically detailed example embodiments using Java agents as the circuit breaker proxying agent process 248, and Hystrix circuit breaker technology and terminology. However, the techniques herein are not so limited, and other suitable application agents (e.g., non-Java) and circuit breaker platforms and paradigms (e.g., Python, note.js, etc.) may be used in a similar manner without departing from the scope of the present disclosure.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    loading, by an agent loaded at an application startup, a circuit breaker into a class loader;
    loading, by the agent, a circuit breaker proxy into an extension class loader seen by the agent and by the application;
    instrumenting, by the agent, selected methods of the application; and
    in response to a call to run an instrumented method:
        setting an identifier (ID) of the circuit breaker proxy to a trackable context;
        holding execution of the circuit breaker proxy until exit of the instrumented method; and
        setting, if exit of the run method is due to a particular exception, an exception of the circuit breaker proxy to reflect the particular exception;
    wherein the circuit breaker monitors the circuit breaker proxy for latency, exceptions, or circuit breaker trip criteria, and stops the instrumented method in response to the latency, exceptions, or circuit breaker trip criteria surpassing a particular respective threshold.

2. The method as in claim 1, further comprising:
    loading the agent into an isolated class loader invisible to the application; and
    monitoring, by the agent, the execution of the instrumented method without circuit breaker knowledge.

3. The method as in claim 1, further comprising:
    finding circuit beaker instrumented method candidates based on one or more of annotations, specifications of class/method, and outbound exit point identification.

4. The method as in claim 1, wherein setting the ID of the circuit breaker proxy to the trackable context comprises:
    creating an exit point name for the trackable context;
    passing the exit point name to the circuit breaker proxy; and
    setting a command key for the circuit breaker to be the exit point name.

5. The method as in claim 1, further comprising:
    dynamically disconnecting instrumentation of one or more particular instrumented methods to disable circuit breaker monitoring of the one or more particular instrumented methods.

6. The method as in claim 1, further comprising:
    learning and setting one or more circuit breaker thresholds based on metrics discovered during a learning period.

7. The method as in claim 1, wherein holding execution of the circuit breaker proxy until exit of the run method comprises:
    locking operation of the circuit breaker proxy upon starting the instrumented method; and
    unlocking operation of the circuit breaker proxy upon exit of the instrumented method.

8. The method as in claim 1, wherein execution of the instrumented method takes place based on a circuit breaker execution selected from a group consisting of: synchronous, asynchronous, and observable.

9. The method as in claim 1, further comprising:
    determining first whether the application has a native circuit breaker preinstalled; and
    using the native circuit breaker as the circuit breaker.

10. The method as in claim 1, further comprising:
    enabling a test mode by disabling circuit breaker stopping of the instrumented method.

11. The method as in claim 1, further comprising:
    setting one or more circuit breaker thresholds based on one or more user-specified criteria.

12. The method as in claim 1, further comprising:
    setting one or more circuit breaker thresholds according to one or more security criteria.

13. The method as in claim 1, further comprising:
    setting one or more fallback configurations to perform in response to stopping the instrumented method by the circuit breaker.

14. A tangible, non-transitory, computer-readable medium having computer-executable instructions stored thereon that, when executed by a processor on a computer, cause the computer to perform a method comprising:
    loading, by an agent loaded at an application startup, a circuit breaker into a class loader;
    loading, by the agent, a circuit breaker proxy into an extension class loader seen by the agent and by the application;
    instrumenting, by the agent, selected methods of the application; and
    in response to a call to run an instrumented method:
        setting an identifier (ID) of the circuit breaker proxy to a trackable context;
        holding execution of the circuit breaker proxy until exit of the instrumented method; and
        setting, if exit of the run method is due to a particular exception, an exception of the circuit breaker proxy to reflect the particular exception;
    wherein the circuit breaker monitors the circuit breaker proxy for latency, exceptions, or circuit breaker trip criteria, and stops the instrumented method in response to the latency, exceptions, or circuit breaker trip criteria surpassing a particular respective threshold.

15. The computer-readable media as in claim 14, wherein the method further comprises:
    loading the agent into an isolated class loader invisible to the application; and
    monitoring, by the agent, the execution of the instrumented method without circuit breaker knowledge.

16. The computer-readable media as in claim 14, wherein the method further comprises:
    finding circuit beaker instrumented method candidates based on one or more of annotations, specifications of class/method, and outbound exit point identification.

17. The computer-readable media as in claim 14, wherein setting the ID of the circuit breaker proxy to the trackable context comprises:

creating an exit point name for the trackable context;

passing the exit point name to the circuit breaker proxy; and setting a command key for the circuit breaker to be the exit point name.

18. The computer-readable media as in claim 14, wherein the method further comprises:

dynamically disconnecting instrumentation of one or more particular instrumented methods to disable circuit breaker monitoring of the one or more particular instrumented methods.

19. The computer-readable media as in claim 14, wherein the method further comprises:

learning and setting one or more circuit breaker thresholds based on metrics discovered during a learning period.

20. An apparatus, comprising:

a processor configured to execute one or more processes; and a memory configured to store a process executable by the processor, the process, when executed, configured to:

load, by an agent loaded at an application startup, a circuit breaker into a class loader;

load, by the agent, a circuit breaker proxy into an extension class loader seen by the agent and by the application;

instrument, by the agent, selected methods of the application; and in response to a call to run an instrumented method:

set an identifier (ID) of the circuit breaker proxy to a trackable context;

hold execution of the circuit breaker proxy until exit of the instrumented method; and set, if exit of the run method is due to a particular exception, an exception of the circuit breaker proxy to reflect the particular exception;

wherein the circuit breaker monitors the circuit breaker proxy for latency, exceptions, or circuit breaker trip criteria, and stops the instrumented method in response to the latency, exceptions, or circuit breaker trip criteria surpassing a particular respective threshold.

* * * * *